US012667105B2

(12) United States Patent　　(10) Patent No.:　US 12,667,105 B2
　　Holzfuss et al.　　　　　　　　(45) Date of Patent:　Jun. 30, 2026

(54) AGRONOMIC COMPOSITION AND ITS USES

(71) Applicant: KWS SAAT SE & Co. KGaA, Einbeck (DE)

(72) Inventors: Constanze Holzfuss, Melsungen (DE); Christoph Kohl, Everswinkel (DE)

(73) Assignee: KWS SAAT SE & Co. KGaA, Einbeck (DE)

( * ) Notice: Subject to any disclaimer, the term of this patent is extended or adjusted under 35 U.S.C. 154(b) by 567 days.

(21) Appl. No.: 18/009,490

(22) PCT Filed: Jun. 15, 2021

(86) PCT No.: PCT/EP2021/066123
　　§ 371 (c)(1),
　　(2) Date: Dec. 9, 2022

(87) PCT Pub. No.: WO2021/255033
　　PCT Pub. Date: Dec. 23, 2021

(65) Prior Publication Data
　　US 2023/0232835 A1　　Jul. 27, 2023

Related U.S. Application Data

(60) Provisional application No. 63/038,963, filed on Jun. 15, 2020.

(30) Foreign Application Priority Data

Jun. 15, 2020　　(DE) ..................... 20 2020 103 414.6

(51) Int. Cl.
| | |
|---|---|
| *A01N 63/22* | (2020.01) |
| *A01N 59/16* | (2006.01) |
| *A01N 63/20* | (2020.01) |
| *A01N 63/27* | (2020.01) |
| *A01P 21/00* | (2006.01) |

(52) U.S. Cl.
　　CPC ............. *A01N 63/27* (2020.01); *A01N 59/16* (2013.01); *A01N 63/20* (2020.01); *A01N 63/22* (2020.01); *A01P 21/00* (2021.08)

(58) Field of Classification Search
　　None
　　See application file for complete search history.

(56) References Cited

U.S. PATENT DOCUMENTS

| | | | | |
|---|---|---|---|---|
| 2016/0297725 A1* | 10/2016 | No | ........................... | C05B 17/00 |
| 2017/0008813 A1* | 1/2017 | Werner | .................... | C05G 5/23 |

FOREIGN PATENT DOCUMENTS

| | | | |
|---|---|---|---|
| CN | 101759500 B | * | 3/2013 |
| CN | 104430540 A | * | 3/2015 |
| CN | 105 693 378 A | | 6/2016 |
| CN | 106 348 914 A | | 1/2017 |
| WO | 2018/197433 A1 | | 11/2018 |

OTHER PUBLICATIONS

Machine translation of CN 101759500-B (Mar. 13, 2013).*
Espacenet Machine translation of CN 10563378 (Jun. 22, 2016).*
USPTO Machine translaton of CN 105693378 (Jun. 22, 2016).*
Isleib, J., "Zinc and manganese: be on alert for deficiencies in sensitive crops," Michigan State University Extension, Field Crops, Sep. 3, 2013, retrieved from the Internet: <https://www.canr.msu.edu/news/zinc_and_manganese_be_on_the_alert_for_deficiencies_in_sensitive_crops>.*
Espacenet Machine translation of CN 104430540 (Mar. 25, 2015).*
International Search Report and Written Opinion issued in International Application No. PCT/EP2021/066123 on Sep. 29, 2021.
Einbeck-1: "New corn treatment INITIO Bird Project: Sustainable treatment component supports phosphate production", KWS Press Information (Nov. 27, 2019), pp. 1-2 XP55841957. Retrieved from the Internet: URL:https://mediamaster.kws.com/04.
Munawar et al., "Effect of seed priming with zinc, boron and manganese on seedling health in carrot (*Daucuscarota*L.)" International Journal of Agriculture and Crop Sciences (Sep. 15, 2013), vol. 5(22), pp. 2697-2702.
Nutriseed: "Seed Treatment Product", Seed Treatment, Feb. 7, 2017 pp. 1-2, CP55841961, Retrieved from the Internet: URL:http://www.vividlifesci.com/wp-conent/uploads/2017/02/17-VLS-0128-SellSheet-NutriSeed_0207175.pdf (retrieved on Sep. 16, 2021).
Bákonyi et al., "Using Biofertilizer to Improve Seed Germination and Early Development of Maize", Pol. J. Environ. Stud. (Nov. 29, 2013), vol. 22, No. 6, pp. 1595-1599.
Zheng et al., "Identification and characterization of inorganic-phosphate-solubilizing bacteria from agricultural fields with a rapid isolation method", AMB Express (2018), vol. 8:47, pp. 1-12. https://doi.org/10.1186/s13568-018-0575-6.
Saeid et al., "Phosphorus Solubilization by *Bacillus* Species", Molecules (2018), vol. 23:2897, pp. 1-18. doi10.3390/molecules23112897.

* cited by examiner

*Primary Examiner* — John Pak
(74) *Attorney, Agent, or Firm* — Troutman Pepper Locke LLP

(57) ABSTRACT

The present invention relates to an agronomic composition comprising zinc, manganese and microorganism(s) capable of promoting nutrient uptake by a plant from the soil. Furthermore, the present invention provides a seed coated by an agronomic composition according to the invention and a method for improving the yield of a plant, in particular for increasing nutrient uptake and/or cold tolerance in early stages of development by applying the agronomic composition according to the invention to a seed or to soil, in which a seed is planted. Finally, the present invention also relates to the use of an agronomic composition of the present invention to improve the yield of a plant. In particular, the composition of the present invention is used to improve recovery of a plant and/or to prevent tissue damage when the plant is exposed to low temperatures at the seed or seedling stage.

9 Claims, 1 Drawing Sheet

AGRONOMIC COMPOSITION AND ITS USES

CROSS-REFERENCE TO RELATED APPLICATIONS

This application is a U.S. National Phase of International Patent Application No. PCT/EP2021/066123, filed on Jun. 15, 2021, which claims priority to German Application No. 20 2020 103 414.6, filed Jun. 15, 2020 and U.S. Application No. 63/038,963, filed Jun. 15, 2020. The entire contents of these applications are incorporated herein by reference in their entirety.

TECHNICAL FIELD

The present invention relates to an agronomic composition comprising zinc, manganese and one or more microorganism(s) capable of promoting nutrient uptake by a plant from the soil, in particular capable of promoting phosphate uptake. Furthermore, the present invention provides a seed coated by an agronomic composition according to the invention and a method for improving the yield of a plant, in particular for increasing nutrient uptake and/or cold tolerance in early stages of development by applying the agronomic composition according to the invention to a seed or to soil, in which a seed is planted. Finally, the present invention also relates to the use of an agronomic composition of the present invention to improve the yield of a plant. In particular, the composition of the present invention is used to improve recovery of a plant and/or to prevent tissue damage when the plant is exposed to low temperatures at the seed or seedling stage.

BACKGROUND

Phosphate is an essential nutrient for plants and therefore required for agricultural production with satisfactory yields. In particular, highly soluble phosphate forms have been used to support early seedling growth. However, due to strict regulations with the aim of avoiding phosphate accumulation in the ground, farmers are now forced to decrease their phosphate fertilization schemes significantly. Still, maintaining high yields of relevant agronomic crop plants is needed at the same time.

The growth of crops such as maize in colder regions like northern Europe is severely limited by low temperatures, which may be encountered in early spring or late summer/autumn. Especially in the early stages of development, i.e. in spring, the plants are vulnerable to cold and yields can be significantly reduced when the plant experiences cold stress during this phase. Most crops of tropical origins such as maize are easily damaged by cold even when it is above freezing. Typical damage includes wilting, necrosis, chlorosis or leakage of ions from cell membranes. The underlying mechanisms of cold sensitivity are not completely understood yet, but probably involve the level of membrane saturation and other physiological deficiencies. For example, photoinhibition of photosynthesis (disruption of photosynthesis due to high light intensities) often occurs under clear atmospheric conditions subsequent to cold late summer/autumn nights. By some estimates, cold accounts for monetary yield losses in the United States (US) second only to drought and flooding. For example, cold may lead to yield losses and lower product quality through the delayed ripening of maize. Another consequence of poor growth is the rather poor ground cover of maize fields in spring, often resulting in soil erosion, increased occurrence of weeds, and reduced uptake of nutrients. A retarded uptake of mineral nitrogen could also lead to increased losses of nitrate into the ground water.

Low temperatures generally decrease the solubility and diffusion of nutrients such as phosphate in the ground and thus make them less accessible to the plant. Even if sufficient phosphate may be present in the soil, the uptake is limited leading to physiological damage from which the plant might not be able to fully recover. Soluble phosphate, which is supplied to the soil as fertilizer, becomes quickly fixed by the ground and is then not accessible for plants anymore. Thus, excess phosphate is accumulated in the ground, which cannot be used by the plants, and, at the same time, has certain drawbacks for the ecosystem.

It is known that some microorganisms are able to solubilize inorganic phosphate, which is fixed in the soil and thus make it available to the plants. The phosphate solubilizing microorganisms produce organic acids, which are largely responsible for the solubilisation of phosphate (Zheng et al., Identification and characterization of inorganic-phosphate-solubilizing bacteria from agricultural fields with a rapid isolation method, *AMB expr*. (2018) 8:47; Saeid et al., Phosphorus Solubilization by *Bacillus* Species, *Molecules* (2018), 23, 2897). However, the presence of phosphate solubilizing microorganisms is not sufficient to effectively prevent damages associated with cold stress in the early stages of plant development.

In view of the regulations regarding phosphate restriction in fertilizers as well as the other issues associated with cold stress in early development of plants, new seed treatment or fertilizer compositions are required to make better use of the phosphate already available in the ground, preferably without having to add any further phosphate. Furthermore, the compositions should be able prevent or mitigate cold stress and the resulting yield loss. Finally, there is an increasing demand to shift from agronomic growth-promoting compositions comprising agro-chemical substances to more eco-friendly compositions including living organisms, or substances derived from a living microorganism as equally effective substitutes for chemical ecologically harmful substances.

It was an object of the present invention to provide agronomic compositions to be used as fertilizers or seed treatments, which are able to promote cold tolerance in plants, in particular during the early stages of development. The compositions should be largely free of phosphorus but allow the plants to effectively access inorganic phosphorus fixed in the soil. Ideally, the compositions should also be free from ecologically harmful substances. Preferably, the agronomic composition should be designed to include more biological substances to make a contribution to a more sustainable agriculture.

SUMMARY OF THE INVENTION

In a first aspect, the present invention provides an agronomic composition comprising
   (a) zinc;
   (b) manganese; and
   (c) one or more microorganism(s) capable of promoting nutrient uptake by a plant from the soil, in particular capable of promoting phosphate uptake.
   In one embodiment the agronomic composition comprises
   (a) 10 to 50 wt.-%, preferably 20 to 40 wt.-% of zinc, and/or (b) 10 to 89 wt.-%, preferably 30 to 80 wt.-% of manganese, and/or (c) 0.1 to 10 wt.-%, preferably 0.5 to 6 wt.-% of dry mass of the one or more microorganism(s), preferably the dry mass of the microorganism(s) comprises between $10^4$ and $10^{10}$ colony forming units per gram, in each case with respect to the total weight of the composition.

In another embodiment, the agronomic composition according to any of the embodiments described above comprises one or more compounds selected from the group consisting of zinc oxide, zinc chelate of ethylenediaminetetraacetic acid (EDTA), zinc chelate of lignosulfonic acid (LS) and zinc sulfate, preferably zinc oxide and/or the composition comprises one or more compounds selected from the group consisting of manganese carbonate, manganese chelate of ethylenediaminetetraacetic acid (EDTA), manganese chelate of lignosulfonic acid (LS) and manganese sulfate, preferably manganese carbonate.

In one embodiment, the agronomic composition according to any of the embodiments described above has a phosphate content of less than 5 wt.-%, preferably less than 3 wt.-%, particularly preferably less than 1 wt.-%, in each case with respect to the total weight of the composition, even more preferably the composition does not contain any phosphate except for unavoidable impurities.

In a further embodiment of the agronomic composition according to any of the embodiments described above, the microorganism(s) is/are selected from the group consisting of *Bacillus, Pseudomonas, Microbacterium, Leuconostoc, Rhodococcus, Beijerinckia, Leifsonia, Sphingomonas, Phyllobacterium, Delftia, Terribacillus, Staphylococcus* and *Izhakiella*, in particular selected from the group consisting of *Bacillus megaterium, Pseudomonas* Psd, *Pseudomonas fluorescens, Bacillus amyloliquefaciens, Bacillus licheniformis, Microbacterium oxydans, Bacillus filamentosus, Bacillus tropicus, Leuconostoc mesenteroides, Rhodococcus jialingiae, Beijerinckia fluminensis, Leifsonia naganoensis, Pseudomonas paralactis, Sphingomonas pseudosanguinis, Pseudomonas azotoformans, Phyllobacterium myrsinacearum, Delftia lacustris, Bacillus cereus, Bacillus aerius, Terribacillus saccharophilus, Staphylococcus warneri, Bacillus subtilis, Bacillus tianshenii, Sphingobacterium suaedae, Pseudomonas poae, Microbacterium flavescens* and *Izhakiella australiensis*, preferably the microorganism or one of the microorganisms is *Bacillus megaterium*.

In one embodiment, the agronomic composition according to any of the embodiments described above comprises humics, preferably in an amount of 0.1 to 30 wt.-%, preferably 1 to 20 wt.-% in each case with respect to the total amount of the composition.

In another embodiment of the agronomic composition according to any of the embodiments described above, the composition comprises one or more substances selected from fungicides, rodenticides, bird repellents and insecticides, preferably selected from the group consisting of Ipconazol, Metalaxyl-M, Metalaxyl, Fludioxonil, Sedaxane, Prothioconazol, Picobutrasox, Ziram, Thiram and Denatonium Benzoate.

In yet another embodiment, the agronomic composition according to any of the embodiments described above comprises at least one antagonistic microorganism and is free of ecologically harmful substances, in particular selected from the group consisting of ecologically harmful pesticides, including carbamate pesticides, including methiocarb, or phosphonate herbicides, including glyphosate.

In a preferred embodiment of the agronomic composition according to the embodiment described above, the at least one antagonistic microorganism is antagonistic to a soil-borne fungal pathogen selected from the group consisting of *Rhizoctonia solani, Sclerotia rolfsii, Macrophomina phaseolina*, or *Fusarium* spp.

In another aspect the present invention also relates to a seed coated by an agronomic composition according to any of the embodiments described above.

In one embodiment, the seed is derived from a plant selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale, Triticale, Hordeum marinum, Aegilops tauschii, Daucus glochidiatus, Beta* spp., including *Beta vulgaris, Daucus pusillus, Daucus muricatus, Daucus carota, Nicotiana sylvestris, Nicotiana tomentosiformis, Nicotiana tabacum, Nicotiana benthamiana, Solanum lycopersicum, Solanum tuberosum, Brassica napus, Brassica oleracea, Brassica rapa, Raphanus sativus, Brassica juncacea, Brassica nigra, Eruca vesicaria* subsp. *sativa, Phaseolus vulgaris, Glycine max, Gossypium* sp., *Helianthus annuus,* and/or *Helianthus tuberosus*, particularly preferably selected from the group consisting of *Beta vulgaris, Zea mays, Triticum aestivum, Hordeum vulgare, Secale cereale, Helianthus annuus, Solanum tuberosum, Sorghum bicolor, Brassica rapa, Brassica napus, Brassica juncacea, Brassica oleracea, Raphanus sativus, Oryza sativa, Glycine max,* and/or *Gossypium* sp., most preferably the seed is derived from *Zea mays*.

In a further aspect, the present invention provides a method for improving the yield of a plant, in particular for increasing nutrient uptake, in particular phosphate uptake, and/or cold tolerance in early stages of cultivation of a plant, comprising a step of:

(i) applying a composition according to any of the embodiments described above to a seed and planting the seed into soil; or (ii) applying a composition according to any of the embodiments described above to soil and planting a seed into the soil; or (iii) planting a coated seed according to any of the embodiments described above into soil.

In one embodiment of the method described above, the seed is derived from a plant selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale,* Triticale, *Hordeum marinum, Aegilops tauschii, Daucus glochidiatus, Beta* spp., including *Beta vulgaris, Daucus pusillus, Daucus muricatus, Daucus carota, Nicotiana sylvestris, Nicotiana tomentosiformis, Nicotiana tabacum, Nicotiana benthamiana, Solanum lycopersicum, Solanum tuberosum, Brassica napus, Brassica oleracea, Brassica rapa, Raphanus sativus, Brassica juncacea, Brassica nigra, Eruca vesicaria* subsp. *sativa, Phaseolus vulgaris, Glycine max, Gossypium* sp., *Helianthus annuus,* and/or *Helianthus tuberosus*, particularly preferably selected from the group consisting of *Beta vulgaris, Zea mays, Triticum aestivum, Hordeum vulgare, Secale cereale, Helianthus annuus, Solanum tuberosum, Sorghum bicolor, Brassica rapa, Brassica napus, Brassica juncacea, Brassica oleracea, Raphanus sativus, Oryza sativa, Glycine max,* and/or *Gossypium* sp., most preferably the seed is derived from *Zea mays*.

In another embodiment of the method according to any of the embodiments described above, no phosphate is supplied to the soil before and while cultivating the plant.

In yet another aspect, the present invention relates to the use of a composition according to any of the embodiments described above to improve the yield of a plant, in particular to increase nutrient uptake, in particular phosphate uptake, and/or cold tolerance in early stages of cultivation, preferably the plant is selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale,* Triticale, *Hordeum marinum, Aegilops tauschii, Daucus glochidiatus, Beta* spp., including *Beta vulgaris, Daucus pusillus, Daucus muricatus, Daucus carota, Nicotiana sylvestris, Nicotiana tomentosiformis, Nicotiana tabacum, Nicotiana benthamiana, Solanum lycopersicum, Solanum tuberosum, Brassica napus, Brassica oleracea, Brassica rapa, Raphanus sativus, Brassica juncacea, Brassica nigra, Eruca vesicaria* subsp. *sativa, Phaseolus vulgaris, Glycine max, Gossypium* sp., *Helianthus annuus,* and/or *Helianthus tuberosus,* particularly preferably selected from the group consisting of *Beta vulgaris, Zea mays, Triticum aestivum, Hordeum vulgare, Secale cereale, Helianthus annuus, Solanum tuberosum, Sorghum bicolor, Brassica rapa, Brassica napus, Brassica juncacea, Brassica oleracea, Raphanus sativus, Oryza sativa, Glycine max,* and/or *Gossypium* sp., most preferably the plant is a *Zea mays* plant.

In one embodiment of the use described above, the composition is used to improve recovery of the plant and/or to prevent tissue damage when the plant is exposed to temperatures of less than 15° C. and/or less than 10° C. for a period of three hours to one week or more at the seed or seedling stage.

In another embodiment of the use described above, preferably wherein the plant is a *Zea mays* plant, the composition is used to improve recovery of the plant and/or to prevent tissue damage when the plant is exposed to temperatures of 11° C. to 15° C. for a period of one week or more, 8 to 10° C. for a period of 2 days to one week, and/or 4 to 8° C. for a period of 12 hours to 3 days, at the seed or seedling stage.

Definitions

An "agronomic composition" in the context of the present invention refers to a composition, which is used to promote plant growth in agriculture, and in particular, also plant seed or seedling grow out at an early stage of plant development, when the seed or seedling is very prone to biotic and abiotic stress, which may cause a severe yield loss. An agronomic composition may be applied to seeds before they are planted or it may be applied to the soil before or after seeds are planted in the soil. Thus, an agronomic composition may be a pickling agent or a fertilizer. The agronomic composition may be applied in dry form or as a suspension, e.g. in water.

A "microorganism" is a microscopic organism, which may exist as a single cell or in a colony of cells. In the context of the present invention, microorganisms are preferably bacteria or fungi which are naturally found in the soil and specialized to macerate valuable sources of nutrients in the soil, which a plant is not able to make use of based on its metabolic capacity. Preferably, a microorganism is a bacterium or a mix of several bacteria (consortium or consortia). The microorganism is provided in the composition of the present invention preferably as a spray dried or lyophilized mass (dry mass) with $10^4$ to $10^{10}$ colony forming units (CFU) per gram. A "colony forming unit" or "CFU" is used to quantify the number of viable bacteria or fungi in a sample, wherein viability refers to the ability to multiply under suitable conditions.

An "antagonistic microorganism" is not particularly limited as long as it is antagonistic to a phytopathogenic microorganism. For example, as Gram-positive bacteria, a bacterium belonging to the genus *Bacillus, Streptomyces* genus actinomycetes, Gram-negative bacteria, *Pseudomonas* genus bacteria, non-pathogenic *Erwinia* genus bacteria, filamentous fungi, non-pathogenic *Fusarium* genus fungi, *Trichoderma* (*Trichoderma*). Examples include filamentous fungi, *Gliocladium* fungi, *Penicillium* fungi, *Talaromyces* fungi, *Pythium* fungi, and the like. This includes antagonistic endogenous bacteria. Endogenous bacteria can be defined as bacteria that can infect and propagate in the plant body but cannot cause plant disease and can be separated by plant sterilization. Endogenous bacteria produce various physiologically active substances, and these actions make plants infected with endogenous bacteria resistant to diseases. One of the phenomena may be systemic induced resistance caused by endogenous bacteria. As is obvious to those skilled in the art, *rhizobia* belonging to the genus *Rhizobium* such as *Rhizobium trifolii, Rhizobium meliloti* and the like are useful microorganisms but not antagonistic microorganisms. That is, the "antagonistic microorganism" in the present invention is other than *rhizobia*.

The term "promoting nutrient uptake" refers to the ability of some microorganisms to increase the availability or accessibility of nutrients in the soil for plants. In particular, in the context of the present invention, promoting nutrient uptake refers to the ability of microorganisms to solubilize inorganic phosphate fixed in the soil and thereby allowing plants growing in the soil to use the phosphate, which would not be accessible to them otherwise. The phosphate solubilizing microorganisms produce organic acids, which provide the solubilizing effect. Moreover, enzymes such as phytases may be produced by a microorganism to solubilize phosphate from certain compounds.

The term "humics" or "humic substances" refers to substance mixtures which are found in soils and water as a result of decomposing vegetation. The substances usually include at least one of fulvic acid, humic acid and ulmic acid besides other components as well as various mixtures and states of decomposition thereof. At a certain stage of decomposition, before reaching the stage of brown coal, the soft brown coal or "leonardite" as well as lignite are also present and included by the term "humics".

"Ecologically harmful substances" are substances, which may be toxic to living organisms, detrimental to their health or irritant and act as repellents when provided in relevant concentrations. Such substances can cause environmental damage if accumulated in the biosphere. Therefore, their use in agronomical applications is strictly regulated. Examples for ecologically harmful substances are pesticides such as bactericides, fungicides, herbicides or insecticides as well as animal repellents, e.g. bird or insect repellents.

A "pesticide" in the context of the present invention is a substance or composition used to protect crop plants from diseases and pest infestation, it includes any herbicide, fungicide, insecticide, acaricide, plant growth regulator and/or repellent. A pesticide is usually, or has formerly been, regulated by a responsible authority. Particular pesticides are usually classified depending on the chemical core structure of said pesticide. Pesticides can include substances later on classified as ecologically harmful. The term pesticide may, however, also include ecologically compatible and sustainable agents.

The term "cold tolerance" refers to the ability of a plant to withstand being exposed to temperatures below its optimal range for certain periods of time. If a plant is exposed to temperatures below optimal rage, the plant will produce less yield if it does not have the required tolerance. In particular, cold tolerance relies on physiological mechanisms, by which the plant can prevent or reduce damage caused by exposure to low temperature, such as "tissue damages" including wilting, necrosis, chlorosis or leakage of ions from cell membranes and inhibited photosynthesis. A plant with sufficient cold tolerance, is able to "recover" from exposure to low temperatures. For example, recovery may refer to the recovery of photosynthetic capacity to the level before exposure within 9-24 hrs following exposure to temperatures below 15° C., or below 10° C. for longer periods i.e., up to 3, 6, 12, 36, 48 hours or a week or more. For *Zea mays*, recovery of the plant and/or prevention of tissue damage in a cold tolerant plant occurs when the plant is exposed to temperatures of 11° C. to 15° C. for a period of one week or more, 8 to 10° C. for a period of 2 days to one week, and/or 4 to 8° C. for a period 12 hours to 3 days, at the seed or seedling stage. In contrast thereto, frost tolerance confers the ability of the maize plant to resist damage from mild frost occurrences. Frost occurrences include about 3 hours at –3° C. or –2° C. for 4 hours or a range of 0° C. to about –5° C. for about 2 to 5 hours.

"Early stages of cultivation" or "early stages of development" of a plant are in particular the seed stage and the seedling stage. In *Zea mays*, the growth stage designated as VE generally refers to an emergence stage, and the vegetative stages are generally referred to as V1, V2, V3, V4 and other V stages until tassel emergence (VT). VT refers to a tasseling stage. During the VE stage most of the growth remains below the soil surface. This protects the seed(ling) from potential late frost. The V (also Vn) stages refer to the leaf stages (n=number of leaves). Each leafing stage carries its own significance. For example, V5 may occur around 14 days after emergence. Cooler soil temperatures will delay the plant from reaching this stage as well as delaying tassel formation. VT refers to the stage when the tassel (for *Zea* spp.) is completely visible when the plant has reached its full height and will begin to shed its pollen. The dates for this staging will vary depending on the climate zone of planting, as it is known to the skilled person.

As used herein, the term "improved yield" or "improving yield" means any improvement in the yield of any measured plant product. The improvement in yield can comprise a 0.1%, 0.5%, 1%, 3%, 5%, 10%, 15%, 20%, 30%, 40%, 50%, 60%, 70%, 80%, 90% or greater increase in measured plant product. Alternatively, the increased plant yield can comprise about a 0.5 fold, 1 fold, 2 fold, 4 fold, 8 fold, 16 fold or 32 fold increase in measured plant products. For example, an increase in the bu/acre yield of *Zea mays* or *Sorghum bicolor* derived from a crop having been treated according to the invention as compared with the bu/acre yield from untreated *Zea mays* or *Sorghum bicolor* cultivated under the same conditions would be considered an improved yield. By increased yield is also intended at least one of an increase in total seed numbers, an increase in total seed weight, an increase in biomass, an increase in dry matter yield and an increase in harvest index. Harvest index is defined as the ratio of yield biomass to the total cumulative biomass at harvest.

An "increased nutrient uptake" or "increasing nutrient uptake" is achieved, when a plant having been treated according to the invention is able to extract and utilize more nutrients present in the soil than an untreated plant. The increase in nutrient uptake can comprise a 0.1%, 0.5%, 1%, 3%, 5%, 10%, 15%, 20%, 30%, 40%, 50%, 60%, 70%, 80%, 90% or greater increase in measured plants compared to untreated plants. Alternatively, the increased nutrient uptake can comprise about a 0.5 fold, 1 fold, 2 fold, 4 fold increase in measured plants compared to untreated plants. The increase in nutrient uptake may be due to microbial action, which renders nutrients accessible or available, which the plant would otherwise not be able to use and/or it may be due to a mitigation of cold associated effects such as reduced diffusion or solubility of nutrients in the soil. In particular, an increased phosphate uptake is observed in the presence of microorganisms, which are able to solubilize fixed phosphate in the soil. In addition, a plant treated according to the invention may show increased cold tolerance by being able to take up phosphate and other nutrient even if the diffusion or solubility of the nutrients in the soil is reduced due to cold temperatures. As a result, the plants phosphate uptake is increased with respect to an untreated plant at the same cold temperature, e.g. below 15° C. or below 10° C. Notably, an increase in phosphate uptake as used herein is not due to supplementation of the soil with additional phosphate.

DETAILED DESCRIPTION

Figure 1:
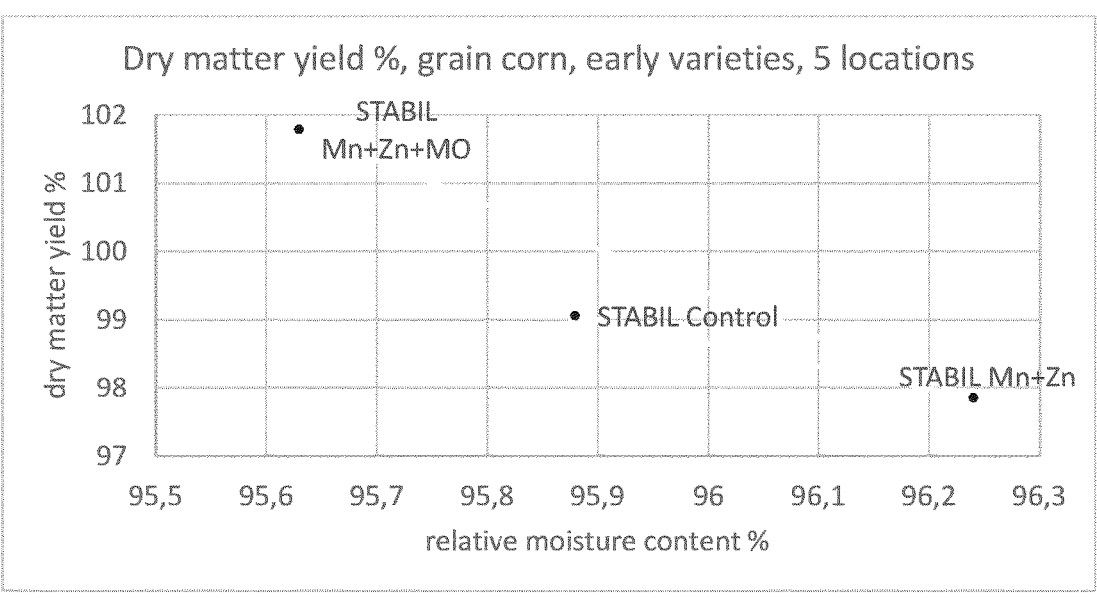
FIG. 1 shows the dry matter yield for different treatments of maize; variety: KWS Stabil; Mn+Zn+MO=Manganese, Zinc and *Bacillus megaterium*; Mn+Zn=Mangenese and Zinc; Control=fungicide treatment with Maxim XL (Fludioxonil and Metalaxy-M); average of 5 locations: Arras, France; Spier, Netherlands; Dretyn, Lejsy, Modrakowo, Poland.

The present invention provides an agronomic composition, which can be used for seed treatment or as a fertilizer, which improves nutrient uptake by a plant and promotes cold tolerance, in particular at the early stage of growing out of a seed or seedling, when the seed or seedling is very vulnerable to environmental (abiotic) and pathogen (biotic) stress. Using the composition of the present invention, plants of warmer origins can be grown in colder regions without risking yield losses due to cold stress in particular in the early cultivation period.

Still, to obtain an agronomic composition having an overall positive effect on plant early growth and the further development needs a series of optimization to define a suitable agronomic composition, where all chemical and biological components perfectly interact with each other so that an agronomic composition with broad applicability for several crop plants comparable in their growth needs can be provided.

Advantageously, the composition of the present invention enables through microbial action to solubilize phosphate in the soil, which plants would otherwise not be able to use.

This makes the compositions more eco-friendly and further completely abolishes the need to add phosphate to the composition as used in huge amounts in presently available compositions. It is therefore not necessary to supply additional phosphate and further phosphate accumulation in the ground can be avoided. The composition being largely phosphate free thus fulfills the strict regulations imposed by the authorities.

In a first aspect the present invention provides an agronomic composition comprising (a) zinc;

(b) manganese; and (c) one or more microorganism(s) capable of promoting nutrient uptake by a plant from the soil, in particular capable of promoting phosphate uptake.

As it is well known, microorganisms as such may not necessarily favor plant outgrowth in an early growth stage unless the microorganism is appropriately selected and the conditions a plant seed(ling) and the microorganism are contacted with are well defined. This is due to the fact that the microorganism as such needs energy to reproduce and grow and thus consumes energy resources and/or produces substances that may be unfavorable for plant growth unless the reaction conditions are chosen to favor plant growth and development.

As can be inferred from the examples below, the addition of the specific microorganism *Bacillus megaterium* and optionally humic acids to a seed treatment with manganese and zinc leads to an increased yield with respect to crops treated only with manganese and zinc. On the other hand, a treatment with only *Bacillus megaterium* or only humic acids, respectively, can reduce germination rates. Surprisingly, however, when the combination of all components is used, there is no significant decrease in germination rate with respect to the treatment with only manganese and zinc. Therefore, the advantageous effect of the *Bacillus megaterium*, namely increasing the yield of the treated crops, can be fully exploited without risking detrimental effects on germination rates.

The agronomic composition may be used directly on seeds as a pickling agent or it may be applied to the soil as fertilizer. For application on seeds or soil, the composition can be either used in solid form or suspended in water. Zinc and manganese are supplied in the form of suitable salts as sources. While some salts are highly water soluble and dissolve quickly upon contact with water, others are less soluble and only gradually release the manganese or zinc over an extended period of time. Suitable salts are given below.

Microorganisms, which are capable of promoting nutrient uptake of the plant from the soil, in particular promoting phosphate uptake, are microorganisms, in particular bacteria, which are able to solubilize phosphate and release it from inorganic compounds, in which it is fixed in the ground. A number of microorganisms have been identified, which are capable of releasing phosphate in the soil (Zheng et al., Identification and characterization of inorganic-phosphate-solubilizing bacteria from agricultural fields with a rapid isolation method, *AMB expr.* (2018) 8:47). It has been shown that the phosphate solubilizing microorganisms produce organic acids such as gluconic, lactic, acetic, succinic and propionic acid, which facilitate the release of phosphate from inorganic compounds. In particular, a strong correlation has been observed between the production of succinic acid and phosphate release (Saeid et al., Phosphorus Solubilization by *Bacillus* Species, *Molecules* (2018), 23, 2897). The capacity to produce organic acids, in particular succinic acid, can therefore be used as a criterion to identify phosphate solubilizing microorganisms to be used in a composition according to the invention. Specific suitable microorganisms are given below. Advantageously, the microorganisms grow and spread with the plant roots so that the beneficial effect continues during cultivation of the plant.

In one embodiment, the agronomic composition described above comprises (a) 10 to 50 wt.-%, preferably 20 to 40 wt.-% of zinc, and/or (b) 10 to 89 wt.-%, preferably 30 to 80 wt.-% of manganese, and/or (c) 0.1 to 10 wt.-%, preferably 0.5 to 6 wt.-% of dry mass of the one or more microorganism(s), preferably the dry mass of the microorganism(s) comprises between $10^4$ and $10^{10}$ colony forming units per gram, in each case with respect to the total weight of the composition.

The weight percentages here refer to the weight of the composition in solid or dry form. The percentages of zinc and manganese refer to the weight of the elements zinc and manganese present in the composition and do not refer to the salts used as zinc or manganese source.

The microorganism(s) are added to the composition as a dry (e.g. lyophilized) mass, which contains a certain amount of colony forming units (CFUs) per gram meaning that they can grow, i.e. multiply, under suitable conditions once they are in the soil or upon contact with water.

In one embodiment of the agronomic composition according to any of the embodiments described above, the composition comprises one or more compounds selected from the group consisting of zinc oxide, zinc chelate of ethylenediaminetetraacetic acid (EDTA), zinc chelate of lignosulfonic acid (LS) and zinc sulfate, preferably zinc oxide and/or the composition comprises one or more compounds selected from the group consisting of manganese carbonate, manganese chelate of ethylenediaminetetraacetic acid (EDTA), manganese chelate of lignosulfonic acid (LS) and manganese sulfate, preferably manganese carbonate.

As mentioned above, different zinc and manganese salts can be used in the agronomic composition of the invention. Depending on their solubility, these salts can release the zinc or manganese either quickly or over an extended period. The less soluble salts allow for a slow uptake by the plant over a longer time and therefore a more sustainable use of the zinc and manganese. Slow uptake forms are e.g. zinc oxide and manganese carbonate.

In a preferred embodiment of the agronomic composition according to any of the embodiments described above, the agronomic composition comprises zinc oxide and manganese carbonate.

In one embodiment of the agronomic composition according to any of the embodiments described above the composition has a phosphate content of less than 5 wt.-%, preferably less than 3 wt.-%, particularly preferably less than 1 wt.-%, in each case with respect to the total weight of the composition, even more preferably, the composition does not contain any phosphate except for unavoidable impurities.

Advantageously, the agronomic composition of the present invention is largely free of phosphate. Phosphate accumulation in the ground can therefore be avoided and the regulations regarding phosphate restriction are complied with. However, due to the action of the microorganism(s) present in the composition, the plants are able to use phosphate that is fixed in inorganic compounds in the soil and would otherwise not be accessible. Since e.g. the cell components of microorganisms or other components of the compositions contain small amounts of phosphate, it is not possible to avoid traces of phosphate in the composition according to the invention. These traces represent unavoidable impurities.

In one embodiment of the agronomic composition according to any of the embodiments described above the microorganism(s) is/are selected from the group consisting of *Bacillus, Pseudomonas, Microbacterium, Leuconostoc, Rhodococcus, Beijerinckia, Leifsonia, Sphingomonas, Phyllobacterium, Delftia, Terribacillus, Staphylococcus* and *Izhakiella*, in particular selected from the group consisting of *Bacillus megaterium, Pseudomonas* Psd, *Pseudomonas fluorescens, Bacillus amyloliquefaciens, Bacillus licheniformis, Microbacterium oxydans, Bacillus filamentosus, Bacillus tropicus, Leuconostoc mesenteroides, Rhodococcus jialingiae, Beijerinckia fluminensis, Leifsonia naganoensis, Pseudomonas paralactis, Sphingomonas pseudosanguinis, Pseudomonas azotoformans, Phyllobacterium myrsinacearum, Delftia lacustris, Bacillus cereus, Bacillus aerius, Terribacillus saccharophilus, Staphylococcus wameri, Bacillus subtilis, Bacillus tianshenii, Sphingobacterium suaedae, Pseudomonas poae, Microbacterium flavescens* and *Izhakiella australiensis*, preferably the microorganism or one of the microorganisms is *Bacillus megaterium*.

The above mentioned microorganisms provide the desired phosphate solubilizing properties. *Bacillus megaterium* was found to produce large amounts of succinic acid and is therefore capable of releasing phosphate from inorganic compounds particularly well. (Saeid et al., Phosphorus Solubilization by *Bacillus* Species, *Molecules* (2018), 23, 2897).

In another embodiment of the agronomic composition according to any of the embodiments described above, the agronomic composition comprises humics, preferably in an amount of 0.1 to 30 wt.-%, preferably 1 to 20 wt.-% in each case with respect to the total amount of the composition.

Humics, which are substances derived from decomposed vegetation, are often used in fertilizer or seed treatment compositions as they provide a good mix of nutrients for the growth of new plants. Humics may include substances such as fulvic acid, humic acid and ulmic acid, lignite and leonardite or soft brown coal.

In one embodiment of the agronomic composition according to any of the embodiments described above, the composition comprises one or more substances selected from fungicides, rodenticides, bird repellents and insecticides, preferably selected from the group consisting of Ipconazol, Metalaxyl-M, Metalaxyl, Fludioxonil, Sedaxane, Prothioconazol, Picobutrasox, Ziram, Thiram and Denatonium Benzoate.

Rodenticides may preferably target to species of the superfamily Muroidea including mice, rats, voles, hamsters and gerbils. Bird repellents may preferably target corvids. Insecticides may be targeted to coleoptera, larvae of coleoptera, lepidoptera, larvae of lepidoptera and aphids.

The addition of fungicides, rodenticides, bird repellents and insecticides to the agronomic composition of the present invention can further increase yields by preventing damage caused by pests or birds. However, it is increasingly desirable to provide compositions, which are substantially free of ecologically harmful substances. Instead of using chemical fungicides, it is also possible to use microorganisms having a fungicidal effect.

In another embodiment of the agronomic composition described above, the composition comprises at least one antagonistic microorganism and is free of ecologically harmful substances, in particular selected from the group consisting of ecologically harmful pesticides, including carbamate pesticides, including methiocarb, or phosphonate herbicides, including glyphosate.

In the last years, substances like methiocarb (mesurol or mercaptodimethur) frequently used as, for example, coating agents for maize seeds as insecticides have been intensively discussed regarding their negative ecological impact. Meanwhile, liquid formulations of methiocarb are no longer approved in the European Union. The compositions as used herein have the huge advantage that these can be assembled in a completely eco-friendly way. As the active ingredients are not harmful to nature, and further assisted by the biological components included, the use of the agronomic compositions of the present invention can thus significantly contribute to a more sustainable crop production.

In a preferred embodiment of the composition described above, the at least one antagonistic microorganism is antagonistic to a soil-borne fungal pathogen selected from the group consisting of *Rhizoctonia solani* (root rot in maize), *Sclerotia rolfsii* (collar rot in maize), *Macrophomina phaseolina* (charcoal rot in maize) and *Fusarium* spp.

Antagonistic microorganisms are e.g. *Pseudomonas* sp. (Proradix), *Pythium oligandrum* M1 (Polyversum) and *Bacillus amyloliquefaciens* (Rhizovital).

In another aspect, the present invention relates to a seed coated by an agronomic composition according to any of the embodiments described above.

Treating a seed with an agronomic composition according to the present invention provides a coated seed as described above, which when it is planted profits from the improved nutrient uptake as well as the cold tolerance provided by the composition. Methods of seed treatment are known to the skilled person. The composition can either be applied in solid form and mixed with the seeds, or, more preferably, it can be suspended in water and the seeds can be soaked in the suspension and subsequently dried to form a crust.

In one embodiment, the seed is derived from a plant selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale,* Triticale, *Hordeum marinum, Aegilops tauschii, Daucus glochidiatus, Beta* spp., including *Beta vulgaris, Daucus pusillus, Daucus muricatus, Daucus carota, Nicotiana sylvestris, Nicotiana tomentosiformis, Nicotiana tabacum, Nicotiana benthamiana, Solanum lycopersicum, Solanum tuberosum, Brassica napus, Brassica oleracea, Brassica rapa, Raphanus sativus, Brassica juncacea, Brassica nigra, Eruca vesicaria* subsp. *sativa, Phaseolus vulgaris, Glycine max, Gossypium* sp., *Helianthus annuus*, and/or *Helianthus tuberosus*, particularly preferably selected from *Beta vulgaris, Zea mays, Triticum aestivum, Hordeum vulgare, Secale cereale, Helianthus annuus, Solanum tuberosum, Sorghum bicolor, Brassica rapa, Brassica napus, Brassica juncacea, Brassica oleracea, Raphanus sativus, Oryza sativa, Glycine max*, and/or *Gossypium* sp., most preferably the seed is derived from a *Zea mays* plant.

Plants that are of tropical origin are often suffering from cold temperatures encountered in early spring in colder climates such as in northern Europe. These plants, e.g. maize (*Zea mays*) and sorghum (*Sorghum bicolor*) can particularly profit from the agronomic composition of the present invention. In a particularly preferred embodiment, the seed is therefore selected form maize or sorghum.

In a further aspect, the present invention provides a method for improving the yield of a plant, in particular for increasing nutrient uptake, in particular phosphate uptake, and/or cold tolerance in early stages of cultivation of a plant, comprising a step of:

(i) applying a composition according to any of the embodiments described above to a seed and planting the seed into soil; or (ii) applying a composition according to any of the embodiments described above to soil and planting a seed into the soil; or (iii) planting a coated seed according any of the embodiments described above into soil.

As mentioned above, it is possible to use the agronomic composition of the present invention as a seed treatment or pickling agent to cover seeds with a coating of the composition and then plant them. Alternatively, the composition may be applied directly to the soil, in which the seed is planted. The cold tolerance is improved when damages of the plant and resulting yield loss after exposure to low temperatures can be prevented or mitigated by physiologic mechanisms in the plant. The plants are most vulnerable to cold stress during the early stages of cultivation, i.e. the seed and seedling stages. Therefore, it is particularly important that lasting damages can be prevented at these stages.

In one embodiment of the method described above the method is for improving phosphate uptake and/or cold tolerance during the seed and seedling stage, preferably cold tolerance allows recovery of the plant and/or the prevention of tissue damage when the plant is exposed to temperatures of less than 15° C. and/or less than 10° C. for a period of three hours to one week or more at the seed or seedling stage.

In another embodiment of the method described above, preferably wherein the plant is a *Zea mays* plant, the method is for improving cold tolerance by facilitating recovery of the plant and/or to prevent tissue damage when the plant is exposed to temperatures of 11° C. to 15° C. for a period of one week or more, 8 to 10° C. for a period of 2 days to one week, and/or 4 to 8° C. for a period of 12 hours to 3 days, at the seed or seedling stage.

In another embodiment of the method according to any of the embodiments above, the seed is derived from a plant selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale*, Triticale, *Hordeum marinum, Aegilops tauschii, Daucus glochidiatus, Beta* spp., including *Beta vulgaris, Daucus pusillus, Daucus muricatus, Daucus carota, Nicotiana sylvestris, Nicotiana tomentosiformis, Nicotiana tabacum, Nicotiana benthamiana, Solanum lycopersicum, Solanum tuberosum, Brassica napus, Brassica oleracea, Brassica rapa, Raphanus sativus, Brassica juncacea, Brassica nigra, Eruca vesicaria* subsp. *sativa, Phaseolus vulgaris, Glycine max, Gossypium* sp., *Helianthus annuus*, and/or *Helianthus tuberosus*, particularly preferably selected from *Beta vulgaris, Zea mays, Triticum aestivum, Hordeum vulgare, Secale cereale, Helianthus annuus, Solanum tuberosum, Sorghum bicolor, Brassica rapa, Brassica napus, Brassica juncacea, Brassica oleracea, Raphanus sativus, Oryza sativa, Glycine max*, and/or *Gossypium* sp., most preferably the seed is derived from a *Zea mays* plant.

In order to avoid phosphate accumulation in the soil and comply with regulations, it is important that as little as possible phosphate is supplied to the soil for cultivating the plant. Since microbial activity in the composition of the present invention allows to use fixed phosphate already present in the soil, it is not necessary to add any additional phosphate before, with or after applying the composition of the present invention.

In one embodiment of the method according to any of the embodiments described above, no phosphate is supplied to the soil before and while cultivating the plant.

In yet a further aspect, the present invention also relates to the use of a composition according to any of the embodiments described above to improve the yield of a plant, in particular to increase nutrient uptake, in particular phosphate uptake, and/or cold tolerance in early stages of cultivation, preferably wherein the plant is selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale*, Triticale, *Hordeum marinum, Aegilops tauschii, Daucus glochidiatus, Beta* spp., including *Beta vulgaris, Daucus pusillus, Daucus muricatus, Daucus carota, Nicotiana sylvestris, Nicotiana tomentosiformis, Nicotiana tabacum, Nicotiana benthamiana, Solanum lycopersicum, Solanum tuberosum, Brassica napus, Brassica oleracea, Brassica rapa, Raphanus sativus, Brassica juncacea, Brassica nigra, Eruca vesicaria* subsp. *sativa, Phaseolus vulgaris, Glycine max, Gossypium* sp., *Helianthus annuus*, and/or *Helianthus tuberosus*, particularly preferably selected from *Beta vulgaris, Zea mays, Triticum aestivum, Hordeum vulgare, Secale cereale, Helianthus annuus, Solanum tuberosum, Sorghum bicolor, Brassica rapa, Brassica napus, Brassica juncacea, Brassica oleracea, Raphanus sativus, Oryza sativa, Glycine max*, and/or *Gossypium* sp., most preferably the plant is a *Zea mays* plant.

In one embodiment of the use described above, the composition is used to improve recovery of the plant and/or to prevent tissue damage when the plant is exposed to temperatures of less than 15° C. and/or less than 10° C. for a period of three hours to one week or more at the seed or seedling stage.

In another embodiment of the use described above, preferably wherein the plant is a *Zea mays* plant, the composition is used to improve recovery of the plant and/or to prevent tissue damage when the plant is exposed to temperatures of 11° C. to 15° C. for a period of one week or more, 8 to 10° C. for a period of 2 days to one week, and/or 4 to 8° C. for a period of 12 hours to 3 days, at the seed or seedling stage.

The invention is described further by the following non-limiting examples.

Example 1: Seed Safety Test

Prior to the field test a seed safety test in the lab was performed. Therefore, recipes including the compounds manganese carbonate, zinc oxide, water and sticker with and without *Bacillus megaterium* was prepared and the liquid slurry treated on the seeds.

A lab batch treating unit (W.N. 5/01 Lab, Willy Niklas GmbH Apparatebau) was used for the treatment.

The required seed quantity is prepared by a dosing unit and released to the mixing chamber. The treating process is based on the rotor/stator principle. The seed is accelerated by a rotating mixing cone and moves to the top of the static cylinder wall. Special bye pass blades on top of the wall guide the rising seed back down to the middle. So a fine seed curtain is built around the liquid spraying disc. The spraying disc produces a fine fog of seed treatment liquid which coats the inner seed curtain as well as the ascending seed at the cylinder wall.

The coated seeds have been checked for germination rates under two different temperature regimes. The results are shown in Table 1.

Standard Germination Test:

4×50 paper rolls are inserted. Rolled up in damp paper with sand, 4 rolls in a plastic bag, 100 ml deionised water added. Then the bags are pre-cooled for 2 days at 10° C., then placed at 25° C. for 6 days.

Cold-Test:

4×50 paper rolls are inserted. Rolled up in damp paper with soil, 4 rolls in a plastic bag, 100 ml deionised water added. Then the bags are cooled for 7 days at 10° C., then placed at 25° C. for 5 days at 80% humidity and constant light.

humic acids and *Bacillus megaterium* increases the yield. The results are obtained in Einbeck, Kleinwanzleben, Wlbertoord, Een.

The relative dry matter yield of the maize variety Stefano treated by the HA 450 (comprising manganese, zinc, humic acids and *Bacillus megaterium*) is 116.67% compared to the variant treated only by manganese and zinc only resulting in 107.99% dry matter yield. The results indicate that addition of humic acids and *Bacillus megaterium* increases the yield. The results are obtained in Modrakowo, Dretyn.

The relative dry matter yield of the maize variety Stabil treated by the HA 450 (comprising manganese, zinc, humic acids and *Bacillus megaterium*) is 105.23% compared to the variant treated only by manganese and zinc only resulting in 102.03% dry matter yield. The results indicate that addition of humic acids and *Bacillus megaterium* increases the yield. The results are obtained in Abrenraa, Ringsted.

TABLE 1

| Germination rate (KF) and Cold-test germination rate (CT) on two varieties | | | | | |
|---|---|---|---|---|---|
| Variety | Chemical | Additive | Sticker | KF | CT |
| STEFANO | MaximXL | MnZn | Peridiam 311 | 99.0% | 98.5% |
| STEFANO | MaximXL | ZnMn & *Bacillus meg.* | Peridiam 311 | 97.5% | 98.5% |
| BERNARDINO | MaximXL | MnZn | Peridiam 311 | 98.5% | 92.0% |
| BERNARDINO | MaximXL | ZnMn & *Bacillus meg.* | Peridiam 311 | 99.0% | 94.5% |

Therefore, it could be shown that the eco-friendly compositions do not only comprise physico-chemical characteristics allowing an efficient coating process which is reproducible and efficient, which is of great importance during high-throughput coating, it could further be demonstrated that the coated seeds indeed have superior characteristics. The coating thus provides all nutrients readily available to the germinating seedling so that a protection of cold stress, an easy availability of nutrients, particularly phosphate directly mobilized from the soil can be guaranteed to obtain optimum plant growth in the critical early phase of development.

Example 2: Field Trials

Figure 2:
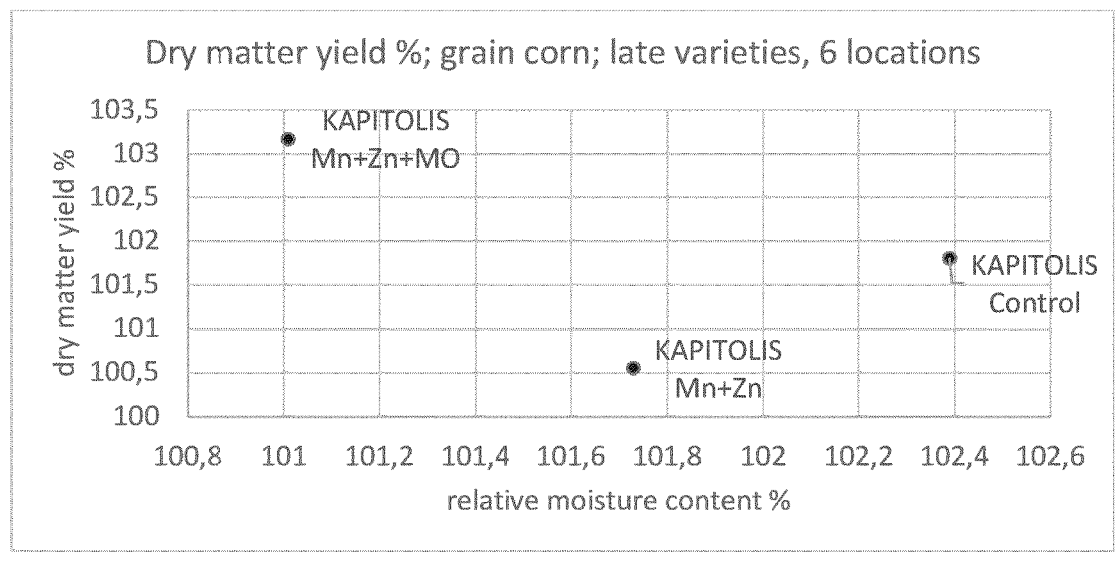
FIG. 2 shows the dry matter yield for different treatments of maize; variety: Kapitolis; Mn+Zn+MO=Manganese, Zinc and *Bacillus megaterium*; Mn+Zn=Mangenese and Zinc; Control=fungicide treatment with Maxim XL (Fludioxonil and Metalaxy-M); average of 6 locations: Boly, Cegled, Ketsoprony, Hungary; Bruck an der Leitha, Austria; Marculesti (dry) and Marculesti (irrigated), Romania.

Field trials have been carried out on different locations, including different soil types and different climate conditions to assess the product performance. FIGS. 1 and 2 are showing the harvest results of the grain corn in Northwestern and south-eastern European location on 2 genotypes.

The relative dry matter yield of the maize variety Bernardino treated by the HA 450 (comprising manganese, zinc, humic acids and *Bacillus megaterium*) is 103.28% compared to the variant treated only by manganese and zinc only resulting in 99.02% dry matter yield. The results indicate that addition of humic acids and *Bacillus megaterium* increases the yield. The results are obtained in Abrenraa, Ringsted. Results are obtained in Wroclaw, Drybus, Lublin.

Example 3: Germination and Cold Test Results

Test condition: KF (germination) maize (sand): 6 days at 25° degrees, 80% humidity and continuous light. CT (Cold Test) maize (soil): 7 days at 10° pre-cooling (dark), then approx. 5 days at 25° degrees, 80% humidity and continuous light.

TABLE 2

| Germination and cold test with *Bacillus megaterium* | | | | | | | |
|---|---|---|---|---|---|---|---|
| Variety | Chemical | Additive | dosage g/u | KF | ΔKF | CT | ΔCT |
| KWS Benedictio | RedigoM | *Bacillus megaterium* | 2.4 | 95.5% | −3.0% | 96.0% | 0.0% |
| Kefrancos | RedigoM | *Bacillus megaterium* | 2.4 | 92.0% | −0.5% | 93.0% | −1.5% |
| Ø | RedigoM | *Bacillus megaterium* | 2.4 | 93.8% | −1.8% | 94.5% | −0.7% |

The relative dry matter yield of the maize variety Robertino treated by HA 450 (comprising manganese, zinc, humic acids and *Bacillus megaterium*) is 100.65% compared to the variant treated by manganese and zinc only resulting in 96.23% dry matter yield. The results indicate that addition of The application of 2.4 g *Bacillus megaterium* lead to a reduction of the germination of the seeds with respect to seeds, which were not treated with *Bacillus megaterium*; as well as to an average reduction of the germination under cold conditions (Cold Test).

TABLE 3

| | | | Germination and cold test with HA 458 and *Bacillus megaterium* | | | | |
| Variety | Chemical | Additive | dosage g/u | KF | ΔKF | CT | ΔCT |
|---|---|---|---|---|---|---|---|
| Amavit | RedigoM 15 ml | HA458 100 ml | *Bacillus megaterium* 2.4 g | 97.5% | 3.0% | 96.5% | −0.5% |
| KWS Akustika | RedigoM 15 ml | HA458 100 ml | *Bacillus megaterium* 2.4 g | 96.5% | −0.5% | 96.5% | 2.0% |
| Ø | RedigoM 15 ml | HA458 100 ml | *Bacillus megaterium* 2.4 g | 97.0% | 1.3% | 96.5% | 0.7% |

The application of manganese, zinc and humic acids (HA458) and *Bacillus megaterium* lead to an average increase in germination and cold test rate with respect to seeds, which were not treated with manganese, zinc, humic acids and *Bacillus megaterium*.

TABLE 4

| | | | Germination and cold test with different compositions | | | | |
| Variety | Chemical | Additive | dosage g/u | KF | ΔKF | CT | ΔCT |
|---|---|---|---|---|---|---|---|
| Ø 10 different varieties | RedigoM | FMC Zn700 Mn500 | 25 & 50 ml/u | 96.8% | 2.1% | 94.3% | 0.4% |
| Ø 10 different varieties | RedigoM | HA450 | 100 ml/u | 96.6% | 1.9% | 94.4% | 0.4% |
| Ø 10 different varieties | RedigoM | WH18 seed | 25 g/u | 94.3% | −0.4% | 91.4% | −2.5% |
| Ø 10 different varieties | RedigoM | BlackJak | 200 ml/u | 95.3% | 0.5% | 91.2% | −2.8% |

In Table 4, an average obtained from 10 maize varieties is given for each additive. The application of the micronutrients manganese and zinc (FMC Zn700 Mn500) lead to an average increase in germination and cold test rate. The application of manganese, zinc, humic acids and *Bacillus megaterium* (HA450) lead to an average increase in germination and cold test rate. The application of humic acids (WH 18 seed) lead to an average decrease in germination and cold test rate. The application of humic acids (BlackJak) lead to an average decrease in the cold test.

As can be inferred from Example 2, the addition of *Bacillus megaterium* and optionally humic acids to a seed treatment with manganese and zinc leads to an increased yield with respect to crops treated only with manganese and zinc.

However, the results in Example 3 indicate that a treatment with only *Bacillus megaterium* (see Table 2) or only humic acids (see Table 4, rows 3 and 4), respectively, can reduce germination. Thus it would be expected that a treatment with a combination of manganese and zinc with *Bacillus megaterium* and humic acids would also lead to a reduced germination rate with respect to a treatment with only manganese and zinc. However, surprisingly, when the combination is used, there is no significant decrease in germination rate with respect to the treatment with only manganese and zinc (see Table 4, rows 1 and 2). Therefore, the advantageous effect of the *Bacillus megaterium*, namely increasing the yield of the treated crops, can be exploited without risking detrimental effects on germination rates.

The invention claimed is:

1. An agronomic composition comprising (a) 20 to 40 wt.-% of zinc oxide;

(b) 30 to 78 wt.-% of manganese carbonate;

(c) 0.5 to 6 wt.-% of dry mass of *Bacillus megaterium*, wherein the dry mass comprises between $10^4$ and $10^{10}$ colony forming units per gram; and (d) 1 to 20 wt.-% humics, in each case with respect to the total weight of the composition, wherein the agronomic composition does not contain any phosphate except for unavoidable impurities.

2. The agronomic composition according to claim 1, wherein the agronomic composition further comprises one or more substances selected from fungicides, rodenticides, bird repellents and insecticides.

3. The agronomic composition according to claim 1, wherein the agronomic composition comprises at least one antagonistic microorganism and is free of ecologically harmful substances selected from the group consisting of carbamate pesticides and phosphonate herbicides.

4. A seed coated by an agronomic composition according to claim 1.

5. The seed of claim 4, wherein the seed is derived from *Zea mays*.

6. A method for improving the yield of a plant the method comprising:

(i) applying an agronomic composition according to claim 1 to a seed and planting the seed into soil; or (ii) applying an agronomic composition according to claim 1 to soil and planting a seed into the soil; or (iii) planting a coated seed coated with an agronomic composition according to claim 1 into soil.

7. The method of claim 6, wherein no phosphate is supplied to the soil before and while cultivating the plant.

8. A method of using an agronomic composition according to claim 1 to improve the yield of a *Zea mays* plant, the method comprising:

(i) applying the agronomic composition to a *Zea mays* seed and planting the seed into the soil; or (ii) planting a *Zea mays* seed coated with the agronomic composition into the soil.

9. The method of claim 8, wherein the agronomic composition is used to improve recovery of the *Zea mays* plant and/or to reduce tissue damage when the *Zea mays* plant is exposed to temperatures of 4 to 8° C. for a period of 12 hours to 3 days, at the seed or seedling stage.

\* \* \* \* \*